(No Model.)

W. WITT.
COW TIE.

No. 589,914.  Patented Sept. 14, 1897.

Witnesses:
H. D. Hallock.
S. J. Williamson.

Inventor
William Witt
by Geo. H. Holgate
Attorney

UNITED STATES PATENT OFFICE.

WILLIAM WITT, OF RIPON, WISCONSIN.

COW-TIE.

SPECIFICATION forming part of Letters Patent No. 589,914, dated September 14, 1897.

Application filed June 2, 1896. Serial No. 594,034. (No model.)

*To all whom it may concern:*

Be it known that I, WILLIAM WITT, a citizen of the United States, residing at Ripon, in the county of Fond du Lac and State of Wisconsin, have invented certain new and useful Improvements in Cow-Ties, of which the following is a specification.

My invention relates to a new and useful improvement in cow-ties, and has for its object to provide a device by means of which a cow may be secured within a stall and yet given a certain amount of freedom to stand or lie down, and also to permit the feeding of the cow while lying down.

With these ends in view my invention consists in the details of construction and combinations of elements hereinafter set forth, and then specifically designated by the claims.

In order that those skilled in the art to which this invention appertains may understand how to make and use the same, I will describe its construction and operation in detail, referring to the accompanying drawings, forming a part of this specification, in which—

Figure 1:
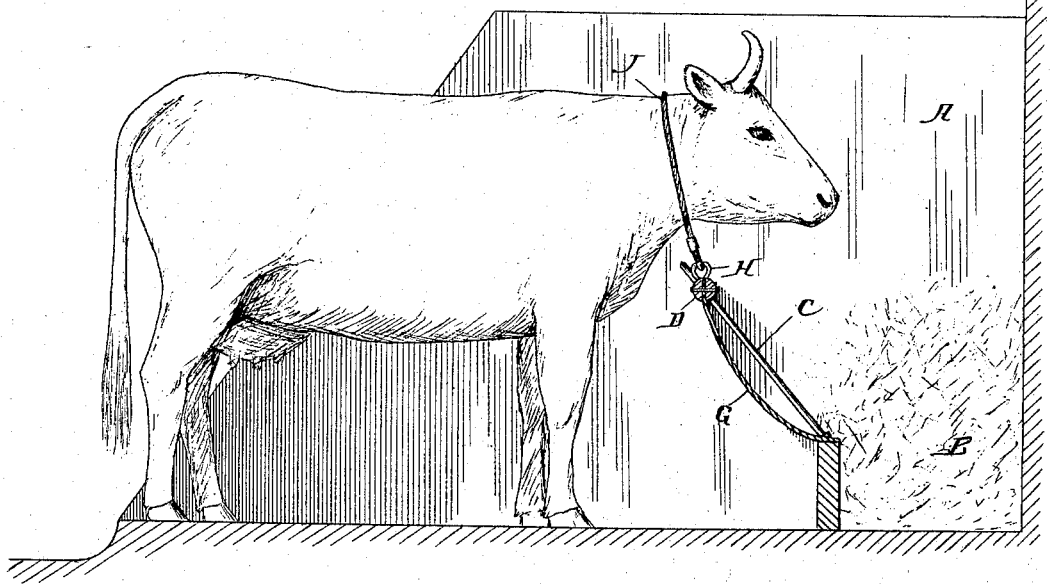
Figure 3:
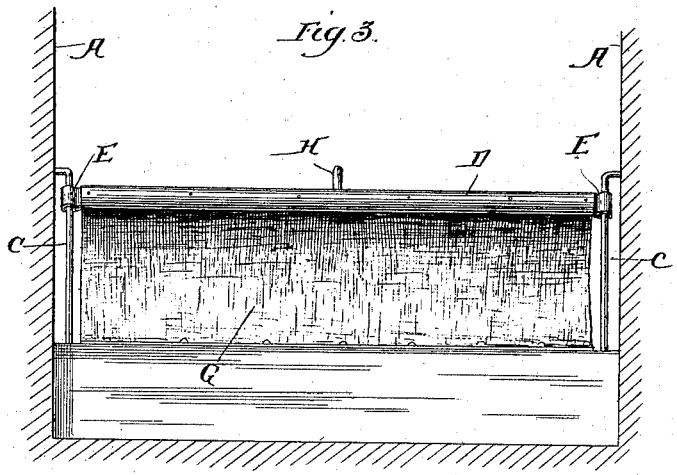
Figure 2:
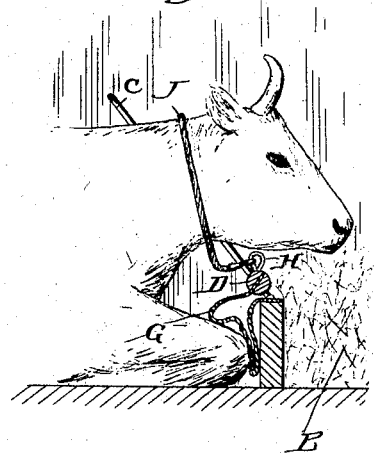
Figure 4:
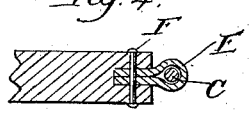

Figure 1 is a central longitudinal section of a stall, showing a cow therein in a standing position; Fig. 2, a similar view of a portion of the stall, illustrating the cow as lying down and still in a position to feed from the rack; Fig. 3, a cross-section of the stall, showing the bracket-rods by means of which the cross-bar is guided; and Fig. 4, a detail section of one end of the cross-bar, illustrating how it is attached to the guide-rods.

Referring to the drawings in detail, A represents the sides of a stall of any convenient design, having a trough or rack B placed at one end thereof, in which the food for the animal is placed. Secured to each of the sides A is a guide-rod C, standing at an angle to the horizontal of about sixty degrees, and these rods serve to guide the cross-bar D, which is attached thereto by the loops E, shown in the drawings as secured to the ends of the cross-bar by rivets F. The lower edge of the shield G is attached to the upper edge of the trough, and the upper edge of the shield is secured to the cross-bar by any suitable means, and I prefer to make this shield of canvas or other flexible material which will fold without injury thereto. An eye H is attached to the center of the cross-rod, by means of which the loop or halter J, passed around the cow's neck, may be attached to said bar, as clearly shown in the drawings. Thus it will be seen that a cow so fastened in a stall may rise to a standing position, as illustrated in Fig. 1, when the cross-bar will be elevated and on account of the guide-rods will be caused to move rearward at the same time, thus forcing the cow backward, and when the animal lowers its head to gain access to the food within the trough the cross-bar will also move downward and forward, permitting said animal to reach the food; and should the animal desire to lie down the cross-bar will move downward and forward until resting upon the upper edge of the trough, bringing the head of the animal in close proximity to said trough, as clearly shown in Fig. 2.

One of the advantages of my improvement is that the shield serves as an apron to guide all of the food which may be scattered by the feeding of the animal back to the trough, and a further advantage is that the animal is given free movement within certain limits within the stall, so that it may not be cramped, and also on account of the rearward movement of the cross-bar when the animal rises to a standing position it will be seen that said animal would be forced backward, which will increase the cleanliness of the stall, as is well understood.

In constructing a tie in accordance with my improvement the cost is exceedingly small in that the only material used therefor is the rod C, cross-bar D, and shield or apron G, and but little labor is required to place these parts in position.

Having thus fully described my invention, what I claim as new and useful is—

1. A cow-tie consisting of a shield or apron, a cross-bar to which said apron is attached, the opposite edge thereof being attached to the trough, a halter secured to the cross-bar, and means for guiding said bar upward and rearward, substantially as and for the purpose set forth.

2. In combination with a trough, a shield having its lower edge attached to said trough, a cross-bar to which the upper edge of said shield is attached, means for securing a cow to the cross-bar, and guide-rods set at an angle to the horizontal and adapted to guide said bar, substantially as shown and for the purpose set forth.

3. In combination with a stall and the trough thereof, a shield having its lower edge attached to the upper edge of said trough, a cross-bar to which the upper edge of said shield is attached, rods C, arranged at an angle to the horizontal and supported by the sides of the stall, loops E, adapted to run upon said rods, said loops being secured to the cross-bar, and means for securing the cow to said cross-bar, substantially as shown and described.

In testimony whereof I have hereunto affixed my signature in the presence of the subscribing witnesses.

WILLIAM WITT.

Witnesses:
S. S. WILLIAMSON,
W. R. LYLE,
FRANK W. LYLE.